US010307936B2

(12) United States Patent
Szücs (10) Patent No.: US 10,307,936 B2
(45) Date of Patent: Jun. 4, 2019

(54) METHOD AND APPARATUS FOR PRODUCING RESHAPED PLASTIC GRANULES

(71) Applicant: András Szücs, Békés (HU)

(72) Inventor: András Szücs, Békés (HU)

( * ) Notice: Subject to any disclaimer, the term of this patent is extended or adjusted under 35 U.S.C. 154(b) by 0 days.

(21) Appl. No.: 15/501,473

(22) PCT Filed: Aug. 4, 2015

(86) PCT No.: PCT/HU2015/050005
§ 371 (c)(1),
(2) Date: Feb. 3, 2017

(87) PCT Pub. No.: WO2016/020712
PCT Pub. Date: Feb. 11, 2016

(65) Prior Publication Data
US 2017/0239845 A1    Aug. 24, 2017

(30) Foreign Application Priority Data
Aug. 4, 2014  (EP) ...................................... 14462006

(51) Int. Cl.
*B29B 9/12*  (2006.01)
*B29B 9/16*  (2006.01)
(Continued)

(52) U.S. Cl.
CPC .................. *B29B 9/16* (2013.01); *B29B 9/12* (2013.01); *B29B 13/065* (2013.01); *F26B 1/005* (2013.01);
(Continued)

(58) Field of Classification Search
CPC . B29C 33/026; B29C 43/04; B29C 2043/043; B29C 43/08; B29C 43/3697;
(Continued)

(56) References Cited

U.S. PATENT DOCUMENTS 2,461,089 A    2/1949  Smidth
2,832,097 A *  4/1958  Ehle ...................... C08L 97/007
                                                    264/120

(Continued)

FOREIGN PATENT DOCUMENTS

DE    1 142 843 B    1/1963
EP    1 650 515 A1   4/2006
(Continued)

*Primary Examiner* — Jeffrey M Wollschlager
(74) *Attorney, Agent, or Firm* — Jason D. Voight (57) ABSTRACT

An apparatus (10) for producing reshaped plastic granules from a plurality of initial granules (12) with a predetermined shape is disclosed comprising: a feeding unit (20) for continuously receiving a plurality of said initial granules (12), a pressing unit (30) for mechanically reshaping the initial granules, said pressing unit comprising at least two opposite pressing surfaces (32) with a gap (34) therebetween, the width (W) of said gap ranging from 0 mm to 0.5 mm, a receiving chamber (40) for receiving the reshaped final granules (13) from the pressing unit, and a frame (50) for supporting the feeding unit, the pressing unit and the receiving chamber. A method is also provided to produce final granules by mechanically reshaping the initial granule, each final granule having a certain surface-to-volume ratio and a primary thickness of at most 0.7 mm within substantially the entire volume of the final granules.

20 Claims, 5 Drawing Sheets

(51) Int. Cl.
  *F26B 1/00*    (2006.01)
  *B29B 13/06*   (2006.01)
  *B29C 33/02*   (2006.01)
  *B29C 43/04*   (2006.01)
  *B29C 43/08*   (2006.01)
  *B29C 43/36*   (2006.01)
  *B29C 43/40*   (2006.01)
  *B29C 53/16*   (2006.01)
  *B29C 53/20*   (2006.01)
  *B29C 67/00*   (2017.01)
  *F26B 17/00*   (2006.01)
  *B29K 105/00*  (2006.01)

(52) U.S. Cl.
  CPC ........ *F26B 17/00* (2013.01); *B29B 2009/125* (2013.01); *B29B 2009/166* (2013.01); *B29C 33/026* (2013.01); *B29C 43/04* (2013.01); *B29C 43/08* (2013.01); *B29C 43/3697* (2013.01); *B29C 43/40* (2013.01); *B29C 53/16* (2013.01); *B29C 53/20* (2013.01); *B29C 67/0003* (2013.01); *B29C 2043/043* (2013.01); *B29K 2105/251* (2013.01)

(58) Field of Classification Search
  CPC ... B29C 43/40; B29C 2043/403; B29C 53/16; B29C 53/20; B29C 67/0003; F26B 17/00; F26B 1/005; B29B 13/065; B29B 2009/166; B29B 9/12; B29B 9/16; B29B 2009/125; B29K 2105/251
  See application file for complete search history.

(56) References Cited

U.S. PATENT DOCUMENTS

| | | | |
|---|---|---|---|
| 3,822,177 A * | 7/1974 | Moked | B29C 44/461 |
| | | | 264/122 |
| 4,339,083 A * | 7/1982 | Linzberger | B02C 4/38 |
| | | | 241/232 |
| 4,976,907 A | 12/1990 | Brotz | |
| 5,195,465 A * | 3/1993 | Webb | C02F 1/681 |
| | | | 119/172 |
| 5,352,780 A * | 10/1994 | Webb | C02F 1/681 |
| | | | 524/35 |
| 5,413,749 A * | 5/1995 | Geiser | B01J 19/30 |
| | | | 264/293 |
| 6,154,980 A | 12/2000 | Maguire | |
| 6,362,157 B1 * | 3/2002 | Blochwitz | C11D 11/0082 |
| | | | 23/313 FB |
| 6,523,763 B1 | 2/2003 | Mizoguchi | |
| 7,347,007 B2 | 3/2008 | Maguire | |
| 8,663,524 B2 | 3/2014 | Alvarez et al. | |
| 2003/0201566 A1 | 10/2003 | Stevens | |
| 2004/0012114 A1 | 1/2004 | Eyerer et al. | |
| 2011/0135851 A1 | 6/2011 | Dozeman et al. | |
| 2012/0061501 A1 | 3/2012 | Kounosu | |
| 2016/0271615 A1 * | 9/2016 | Hao | B02C 15/00 |

FOREIGN PATENT DOCUMENTS

| | | | |
|---|---|---|---|
| EP | 2471642 | * | 7/2012 |
| GB | 210 409 | | 11/1924 |
| GB | 1 050 158 | | 12/1966 |

\* cited by examiner

METHOD AND APPARATUS FOR PRODUCING RESHAPED PLASTIC GRANULES

This is the national stage of International Application PCT/HU2015/050005, filed Aug. 4, 2015.

The present invention relates to a method and an apparatus for mechanically reshaping plastic granules (or pellets) as well as to mechanically reshaped plastic granules (or pellets) produced by such a method.

Figure 1A:
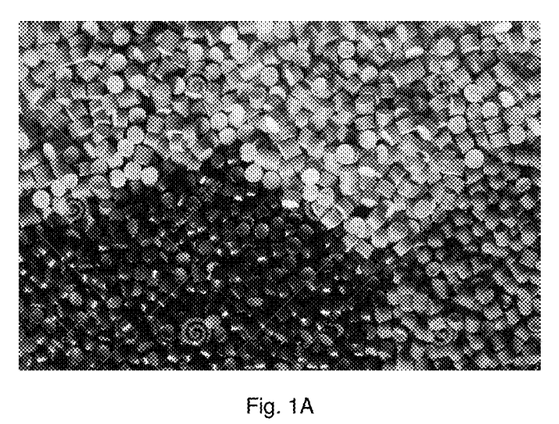
FIGS. 1A and 1B show heaps of plastic granules having conventional shapes, in particular a cylindrical tin-like shape and a lenticular shape, respectively.
Figure 1B:
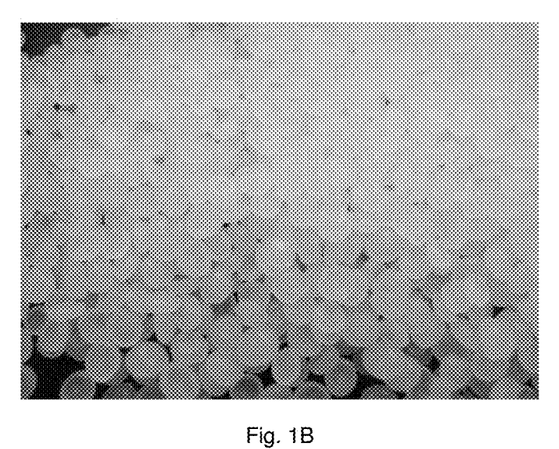

Conventionally, for plastic-moulding processes, such as injection-moulding or extrusion, the plastic material is fed into a processing machine in the form of granules. The granules are normally available with a predetermined shape, mostly in a cylindrical tin-shaped or lens-shaped form as shown in FIGS. 1A and 1B, respectively. Due to certain restrictions in the production of such granules, the extensions of the granules in each of their three spatial directions (i.e. length, width, height) typically range from 1 mm to 4 mm, while their volume typically ranges between approx. 10 and 20 $mm^3$. However, some kind of plastic materials, e.g. the hygroscopic polymeric materials, can absorb moisture from the ambient air, which impairs the processability of the granules and the quality of the final plastic product. To avoid this, before moulding the granules, they are subject to pre-dry in a drying apparatus, in which the drying time normally takes about 2 to 8 hours at a drying temperature of approximately 70° C. to 180° C. in order to achieve a substantial drying of the granules. The drying parameters mostly depend on the type of the polymeric material.

Such a drying process requires considerably high energy, which significantly increases the production cost of the plastic end-products. For example, pre-drying conventional plastic granules may require a specific energy consumption of ca. 40 kWh/1000 kg.

Besides the energetic considerations, oxidation of the granules is another important issue in the plastic moulding processes. During a relatively long pre-drying time, at the aforementioned drying temperatures, the oxygen molecules of the ambient air may react with the components of the granules (e.g. the macromolecules or the additives), which may cause a degradation of said components.

The long pre-drying time can also contribute to the undesired phenomenon of migration. In this process, the additives move from the inside of the granules to the surface of the granules, therefore changing the spatial distribution of the additives within the volume of the granules in an undesired fashion.

One possible way of reducing the pre-drying time is the application of a vacuum drying chamber, in which the air pressure is maintained at a lower level than the ambient air pressure, therefore diffusion of water molecules within the granules (from the inside of the granules to the surface thereof) can be speeded up. Such vacuum dryers are disclosed, for example, in documents EP 1650515 A1, U.S. Pat. Nos. 6,154,980 and 7,347,007. Although in such vacuum dryers, the pre-drying time can be reduced by approximately 85% relative to the conventional (non-vacuum) dryers, these apparatuses suffer from the extremely high price and the rather complicated technical design and operation, which encumbers their common utilization.

In the drying process of polymeric granules, the key issue is the time of diffusion of water molecules from the inside (in particular from the innermost central region of the granules) to the surface of the granules. With the conventional (e.g. cylindrical tin-like, spherical, lenticular) shapes of the plastic granules commonly used in the plastic moulding industry as a raw material, the diffusion time of the water molecules is rather low due to the relatively high mass transport within the grain material.

The document EP 1120436 A1 discloses a method for producing thermoplastic resin granules, wherein first a powdery raw material of a thermoplastic resin is compression-molded by being passed between two rolls arranged parallel with a minute gap therebetween, and the obtained compression-molded product is then crushed into granules having grain diameters of 10 mm or less. The surface of the pressing rolls have curved concavities with a depth of 1.5 mm and the distance between the rolls is 0.5-1.0 mm, resulting in grains in the form of briquettes with a minimum thickness of 3.5 mm.

The invention is based on the idea that by adequately modifying the initial shape of the plastic granules to obtain a flat or sheet-like or shell-like shape for the granules, the diffusion time of the water molecules from the inside of the granules to their external surface can be significantly reduced both by the increased surface-to-volume ratio of the granules and the reduced thickness of the granules.

It has been also realized that mechanically reshaping of the plastic granules by pressing generates micro-cracks in the materials, which also enhances the migration of water molecules within the granules towards the external surface thereof.

It is an object of the present invention to provide a method and an apparatus for mechanically reshaping the conventional plastic granules to produce reshaped granules that are capable of drying significantly faster than the plastic granules of conventional shapes.

In a first aspect, the present invention relates to a method of producing reshaped plastic granules, the method comprising the step of:

providing a plurality of initial granules with a predetermined shape, each initial granule having (a) a main plane defined by the two largest, substantially orthogonal dimensions thereof and (b) a primary thickness defined as the dimension thereof in a direction orthogonal to the main plane of the granule, and (c) a predetermined average surface-to-volume ratio of at most 3 $mm^2/mm^3$, wherein the primary thickness of the initial granules is at least 1 mm within substantially the entire volume of the granules, wherein the method further comprises the step of:

mechanically reshaping the initial granules to produce final granules, each final granule having a surface-to-volume ratio of at least 4 $mm^2/mm^3$, and a primary thickness of at most 0.7 mm within substantially the entire volume of the final granules.

The step of mechanical reshaping may be performed by pressing the initial granules by means of a pressing means with at least two opposite pressing surfaces with a gap between, the width of said gap ranging from 0.05 mm to 0.5 mm.

In a preferred embodiment of the method, the pressing means comprises a rotating pressing roll and a stationary pressing counterpart.

In another preferred embodiment of the method, the pressing means comprises one or more pairs of contra-rotating pressing rolls.

The co-operating contra-rotating pressing rolls may be rotated at the same rotational speed or at different rotational speeds.

The pressing surfaces are preferably tempered to have an optimal surface temperature depending on the material of the initial granules.

In a preferred embodiment of the method, any residual material of the reshaped granules is removed from the pressing surfaces of the pressing means.

In a second aspect, the present invention relates to an apparatus for producing reshaped plastic granules from a plurality of initial granules with a predetermined shape and an initial thickness of at least 1 mm within substantially the entire volume of the granules, the apparatus comprising:

- a feeding unit for continuously receiving a plurality of said initial granules,
- a pressing unit for mechanically reshaping the initial granules, said pressing unit comprising at least two plain pressing surfaces with opposite to each other with a gap between, the width of said gap being adjustable between 0 mm and 0.5 mm,
- a receiving chamber for receiving the reshaped final granules from the pressing unit, and
- a frame for supporting the feeding unit, the pressing unit and the receiving chamber.

In a preferred embodiment of the apparatus, the pressing unit comprises a rotating pressing roll and a stationary pressing counterpart.

In another preferred embodiment of the apparatus, the pressing unit comprises one or more pairs of contra-rotating pressing rolls. In this embodiment, the co-operating contra-rotating pressing rolls may be rotated at the same rotational speed or at different rotational speeds.

The pressing surfaces of the apparatus may be made to have a surface texture selected from the group of: roughened, ribbed, indented, toothed, said surface texture having a depth of at most 0.05 mm.

In a preferred embodiment of the apparatus, each rotating pressing roll of the pressing unit is equipped with a doctor blade for the removal of any residual material of the reshaped granules from the respective pressing surfaces.

It is also preferred that at least one pressing roll of the pressing unit comprises a movable bearing for adjusting the width of the gap between the pressing surfaces of the pressing unit.

The receiving chamber of the apparatus may be provided with a drying means for drying the reshaped final granules.

The receiving chamber of the apparatus may comprise an opening on its bottom for transporting the final granules for further processing, in particular to a plastic moulding apparatus.

In a third aspect, the present invention relates to a plastic granule used in the form of a granulate for making moulded plastic products, the granule having (i) a main plane defined by the two largest, substantially orthogonal dimensions thereof and (ii) a primary thickness defined as the dimension in a direction orthogonal to the main plane of the granule, wherein the primary thickness of the granule is smaller than 0.7 mm within substantially the entire volume of the granules, and the granule has a surface-to-volume ratio greater than 4 $mm^2/mm^3$.

The method and the apparatus according to the invention have the benefit that the period of pre-drying of the plastic granules can be significantly reduced or even eliminated, which results in a substantial save of energy, a reduced degradation of the additives and a reduced migration of the additives before moulding, and ultimately, a higher quality of the plastic end-products.

The benefits and advantages of the present invention will become apparent from the detailed description with reference to the accompanying drawings, in which.

Some typical shapes of conventional granules, such as cylindrical tin-like shaped and lentils-shaped granules, commonly used in the plastic moulding industry can be seen in FIGS. 1A and 1B that show the plastic granules in heaps. The geometrical features of a generic granule are illustrated in FIG. 1C in a perspective view and a side view.

Figure 1C:
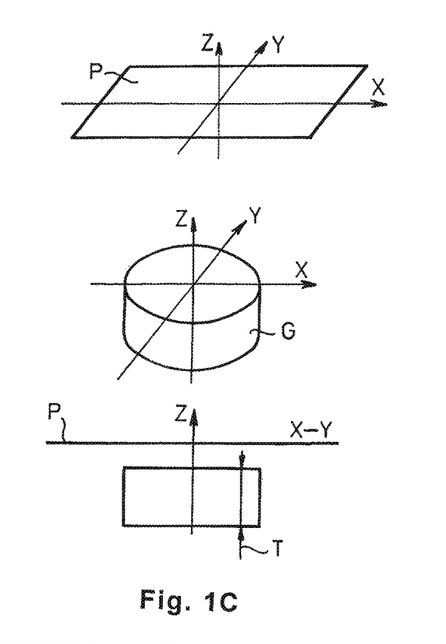
FIG. 1C shows the geometrical features of a generic granule in perspective view and side view.

According to FIG. 1C, there is a main plane P assigned to each grain G, said main plane P being defined by the two largest, substantially orthogonal extensions X and Y (e.g. length and width) of the grain G. A primary thickness T is defined for each grain G as the dimension of the grain G extending in a direction Z, which is orthogonal to the main plane P of the grain G. The primary thickness T may be regarded, for example, as the height of a grain G. While the typical extensions of the conventional granules, such as the granules shown in FIGS. 1A and 1B, in the main plane thereof are 3-4 mm in the directions of their both largest extensions, the primary thickness of those granules typically ranges from 1 to 3 mm within substantially the entire volume of the granules.

Additionally, the granules of the same shape also have a characteristic (or average) surface-to-volume ratio, which is typically smaller than 3 $mm^2/mm^3$ for all kinds of conventionally shaped granules.

According to the first aspect of the present invention, the method of producing reshaped plastic granules comprises the following steps.

First, a plurality of initial granules with a predetermined shape are provided, each initial granules having a primary thickness of at least 1 mm within substantially the entire volume of the granules. In the next step, the initial granules are mechanically reshaped to produce a plurality of final granules that are ready for further processing in the plastic moulding industry. The mechanical reshaping is carried out so that the reshaped granules have a surface-to-volume ratio of at least 4 $mm^2/mm^3$, and a primary thickness of at most 0.7 mm within substantially the entire volume of the granules.

Figure 1D:
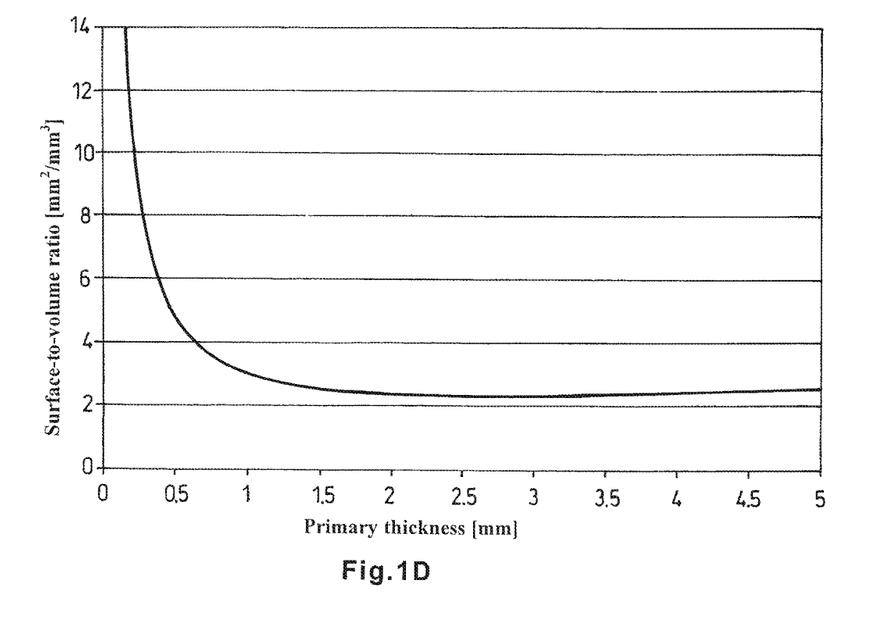
FIG. 1D shows the surface-to-volume ratio of the granules as a function of the primary thickness thereof.

As an example, FIG. 1D shows the surface-to-volume ratio of a granule having a typical volume of 14 $mm^3$ as a function of the primary thickness thereof. As it can be seen in FIG. 1D, while the surface-to-volume ratio of the particular granule is about 2.5-3 $mm^2/mm^3$ for primary thicknesses above 1 mm, the surface-to-volume ratio starts to increase dramatically as the primary thickness of the granule is reduced below 1 mm. When the primary thickness is smaller than ca. 0.6 mm, the surface-to-volume ratio is greater than 4 mm$^2$/mm$^3$ and can increase up to 14 mm$^2$/mm$^3$ or even higher.

As an example, Table 1 shows the major geometrical parameters of various granules with different shapes. In Table 1, the primary thickness, the diameter in the main plane, the surface, the volume and the surface-to-volume ratio are given for a cylindrical granule, a lens-shaped granule, a spherical granule and a flattened (reshaped) granule according to the invention.

TABLE 1

| Primary thickness (mm) | Diameter in the main plane (mm) | Surface (mm$^2$) | Volume (mm$^3$) | Surface-to-volume ratio (mm$^2$/mm$^3$) |
|---|---|---|---|---|
| cylindrical granule | | | | |
| 3 | 2.5 | 33.36 | 14.72 | 2.27 |
| 2.2 | 3.3 | 39.89 | 18.81 | 2.12 |
| lens-shaped granule | | | | |
| 2.37 | 3.74 | 49.79 | 26.02 | 1.91 |
| spherical granule | | | | |
| 2 | 2 | 12.56 | 4.19 | 3 |
| flattened (reshaped) granule | | | | |
| 0.5 | 6 | 65.85 | 14.00 | 4.70 |
| 0.1 | 12 | 230.08 | 12.00 | 19.17 |

Preferably, the primary thickness of the reshaped granules is set to be greater than 0.05 mm, although certain plastic materials (e.g. polyamide, polyethylene, PA-12, thermoplastic elastomers) may be suitable for producing reshaped granules with a primary thickness of even 0.01 mm.

The mechanical reshaping may be carried out in several ways. One possible way of mechanical reshaping is pressing the initial granules. Pressing is carried out by using at least two pressing surfaces with a gap between them. To produce the reshaped granules with the above mentioned desired primary thickness and surface-to-volume ratio, the width of the gap between said pressing surfaces should be at most 0.7 mm, preferably in the range from 0.05 mm to 0.7 mm. It is noted that granules made of certain materials with an initial thickness of smaller than 0.05 mm may be inappropriate for storage and transportation due to the increased crumbling and the technological constrains with respect to the adjustment of the smallest gap width. The minimum value of the thickness of the reshaped granules depends on several technological parameters of the pressing and also on the particular material of the initial granules.

The pressing surfaces may be provided, for example, by means of a rotating pressing roll and a stationary pressing counterpart, or one or more pairs of two contra-rotating pressing rolls. A series of subsequent pressing steps with increasingly smaller gaps between the pressing surfaces may also be appreciated.

When using contra-rotating pressing rolls for pressing the initial granules, the co-operating pressing rolls may be rotated either at an equal rotational speed or at different rotational speeds. The application of different rotational speeds for the co-operating pressing rolls has the advantage that additional friction applies along the surfaces of the granules that are in contact with the pressing surface. This additional friction generates heat, which helps to soften the plastic granules and improves the drying process.

Preferably, during pressing, the pressing surfaces are tempered (heated or cooled) to have a surface temperature of an optimal temperature range that depends on the material of the initial plastic granules. (For example, the pressing surface temperature is preferably in the range of 80° C. to 180° C. for conventional plastic granules so that the plastic granules under press get softened, which allows an easier shaping of the granules, while the granules do not stick to the pressing surfaces or to each other.) For any material of the initial plastic granules, the particular surface temperature of the pressing surfaces should be kept below the flow temperature or the melting temperature of the material of the granules.

Depending on the particular material of the plastic granules, the granules might tend to stick to the pressing surfaces after pressing. Therefore it is preferred that in a further step of the method of reshaping granules, any residual material of the reshaped granules is removed from the pressing surfaces continuously or intermittently in order to keep the pressing surfaces clear. The residual material remaining the pressing surfaces may have various adverse effects. For example, the residual material may reduce the heat transfer from the pressing surfaces to the granules (when the pressing surfaces are heated), and they may also unevenly decrease the width of the gap between the pressing surfaces, which may lead to a higher rate of waste of the reshaped granules (because of the too small thicknesses).

According to the second aspect of the present invention, an apparatus 10 is provided for producing reshaped plastic granules from a plurality of initial granules 12 with a predetermined shape. The initial granules are conventionally shaped granules, such as shown in FIGS. 1A and 1B, and may be characterized by the geometrical features described above with reference to FIG. 1C. The initial granules have a primary thickness of at least 1 mm within substantially the entire volume of the granules, and a predetermined characteristic (or average) surface-to-volume ratio of at most 3 mm$^2$/mm$^3$.

Figure 2:
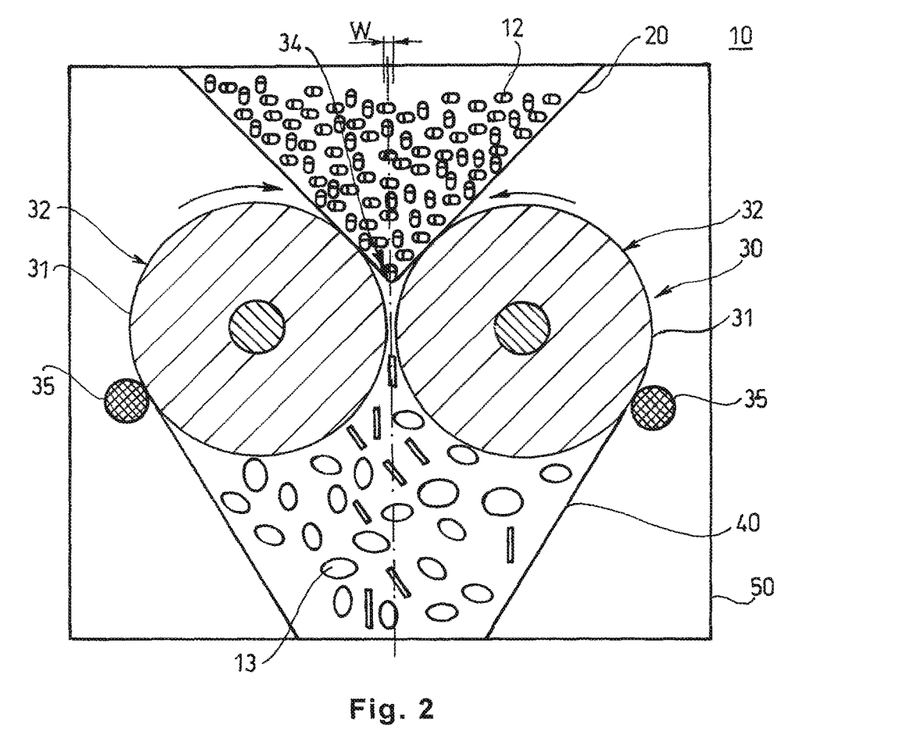
FIG. 2 illustrates a schematic view of the reshaping apparatus according to the present invention.

The reshaping apparatus 10, shown in FIG. 2, comprises a feeding unit 20 for continuously receiving a plurality of said initial granules 12. The feeding unit 20 may be a hopper or any other kind of receptacle with at least one bottom opening adapted to feed the initial granules 12 to a downstream mechanical reshaping stage.

The reshaping apparatus 10 further comprises a pressing unit 30 for mechanically changing the shape of the initial granules 12, said pressing unit 30 comprising at least two plain pressing surfaces 32 arranged opposite to each other with a gap 34 between. The width W of said gap 34 is at most 0.7 mm, and preferably adjustable between 0 mm and 0.5 mm. It is noted that in case the width W of the gap 34 is 0 mm (i.e. the pressing surfaces are in contact) in the idle state of the pressing unit 30, an elastic deformation of the metallic pressing surfaces 32 during the pressing operation still allows pressing the granules 12, resulting in reshaped final granules 13 with a primary thickness of a few hundredth of millimeter.

The pressing unit 30 is coupled to a downstream receiving chamber 40 for receiving the reshaped final granules 13 falling down from the pressing unit 30.

The feeding unit 20, the pressing unit 30 and the receiving chamber 40 are mounted on a supporting frame 50.

In a preferred embodiment of the reshaping apparatus according to the invention, the pressing unit comprises a rotating pressing roll and a stationary pressing counterpart, between the respective pressing surfaces of which the initial granules can be reshaped.

In a particularly preferred embodiment of the reshaping apparatus according to the invention, the pressing unit 30 comprises one or more pairs of contra-rotating pressing rolls 31 with cylindrical pressing surfaces 32. The co-operating contra-rotating pressing rolls 31 may be rotated at an equal rotational speed or at different rotational speeds. At least one of the pressing rolls 31 is driven by motors, and the operational parameters (e.g. rotational speed, gap width, etc.) may be controlled externally through an operator in a manner well known for those skilled in the art.

It is preferred that the pressing surfaces 32 of the pressing rolls 31 are tempered (heated or cooled) to have an optimal surface temperature for the material of the granules under pressing. Heating the pressing surfaces may be provided, for example, by electrical heating wires arranged in the body of the pressing rolls 31, preferably adjacent to the cylindrical pressing surfaces 32 that get in contact with the plastic granules 12 during pressing. Alternatively, tempering the pressing surfaces 32 of the pressing rolls 31 may also be provided through heating or cooling liquid tubes arranged inside the pressing rolls 31.

In the simplest case, the plain pressing surfaces 32 may be formed to be smooth to produce reshaped granules with smooth surface. However, in a preferred embodiment of the reshaping apparatus 10 according to the invention, the plain pressing surfaces 32 may be made to have a predefined surface texture, such as roughened, toothed, indented or ribbed profile so that nipping of the initial granules into the gap 34 between the pressing rolls 31 is enhanced.

Preferably, the surface texture has a depth of at most 0.05 mm. A further advantage of providing such a profiled pressing surface 31 is that during pressing, the uneven surface pattern of the pressing rolls 31 is transferred onto the external surface of the reshaped granules 13, thereby further increasing the area of their external surfaces, which results in a more increased surface-to-volume ratio of the reshaped granules 13.

As it is also shown in FIG. 2, each rotating pressing roll 31 of the pressing unit 30 may be equipped with a doctor blade 35 for the removal of any residual material of the reshaped granules 13 from the respective pressing surfaces 32. The doctor blades 35 may be bought into contact with the pressing surfaces 32 permanently or they may be used for given intervals when the amount of the residual material on the pressing surfaces 32 exceeds a certain limit.

In a preferred embodiment of the reshaping apparatus of the invention, at least one pressing roll 31 comprises a movable bearing that allows a precise adjustment of the width W of the gap 34 between the pressing surfaces 32.

In certain applications, the receiving chamber 40 may be provided with a dryer (not shown) for drying the reshaped final granules 13 within the receiving chamber before their further processing, if necessary.

Figure 4:
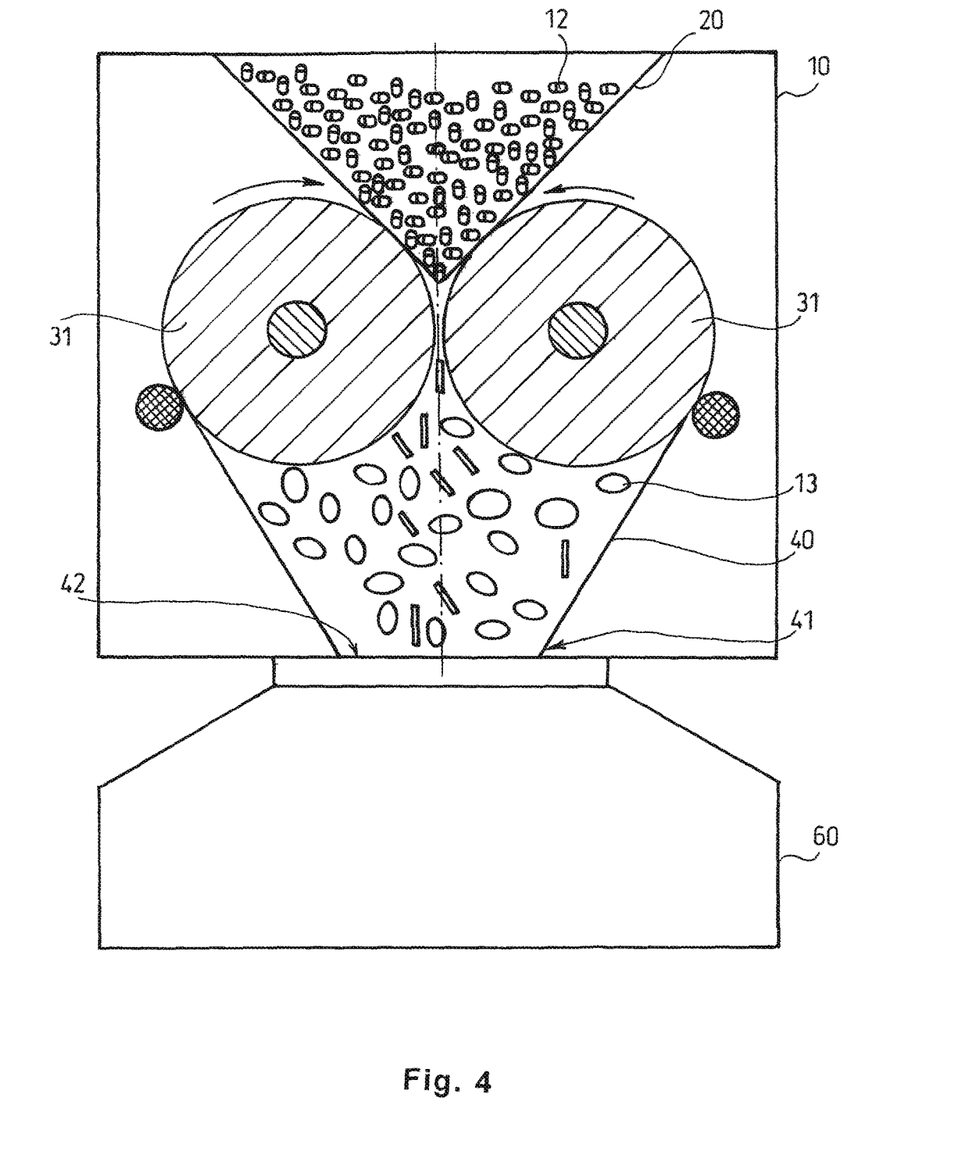
FIG. 4 is a diagram showing results of thermo-gravimetric test measurements made for conventionally shaped granules and reshaped granules produced in accordance with the present invention.

In case, the reshaping apparatus 10 is coupled to a moulding apparatus 60, as schematically illustrated in FIG. 4, or to any kind of subsequent processing or pre-processing stage, the receiving chamber 40 comprises an opening 42 on its bottom 41 for transporting the final granules 13 for further processing in the moulding apparatus 60 (or in any other downstream processing or pre-processing stage).

Figure 3A:
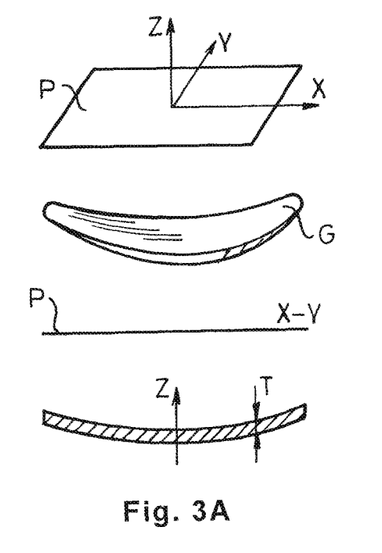
FIGS. 3A and 3B show various exemplary shapes of the mechanically reshaped granules according to the present invention in perspective view and side view.
Figure 3B:
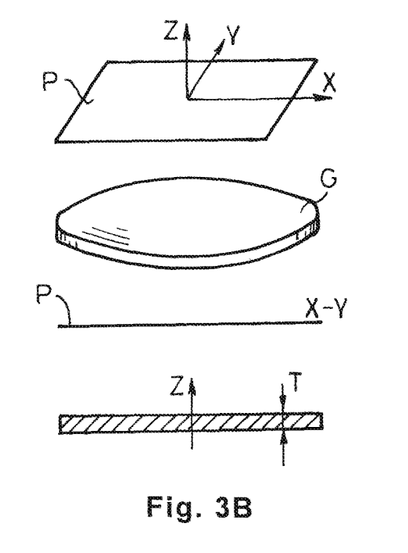

Some exemplary shapes of the reshaped granules produced by mechanically reshaping in accordance with the present invention are shown in FIGS. 3A and 3B in perspective view and side view with also depicting the geometrical features of the granules. FIG. 3A shows a flattened sheet-like (substantially planar) granule that may be produced by using pressing rolls rotating at the same speed. FIG. 3B shows a flattened shell-like (somewhat three-dimensional) granule that may be produced, for example, by using pressing rolls rotating at different speeds.

Figure 5:
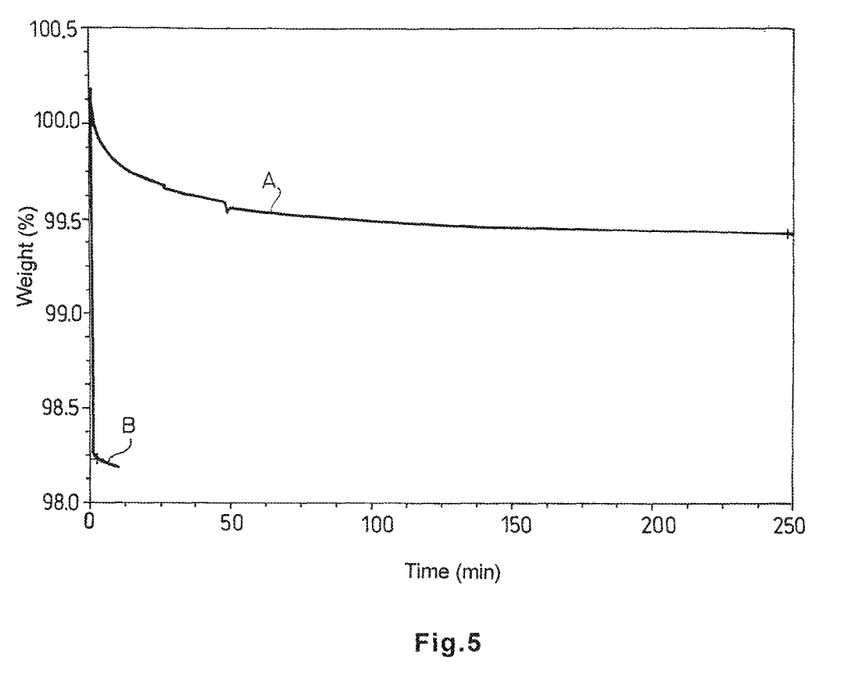
FIG. 5 schematically illustrates the application of the reshaping apparatus of the invention with a common plastic moulding apparatus.

Thermo-gravimetric (TGM) measurements have been carried out in a hot-air dryer to demonstrate the effect of reshaping on the drying process of the granules. In the tests the loss of weight of the sample granules (each one weighing 20 mg) was measured while they were subject to heating. FIG. 5 shows a line diagram of the change in the weight of the granules (measured in percentage) as a function of heating time (measure in minutes) both for conventionally shaped granules (line 'A') and reshaped granules (line 'B') produced in accordance with the present invention. According to the test results, while the weight of the conventional granules decreases very slowly along time (i.e. a weight loss of about 0.6% is achieved after a period of 3-4 hours), the weight of the reshaped granules decreases dramatically (i.e. within a few minutes in the particular test), meaning that the drying time of the reshaped granules is significantly shorter than that of the conventional granules.

Based on the test results, the following conclusions may be made. Due to mechanical reshaping of the plastic granules:
- the moisture ($H_2O$) existing inside the granules had to take a much shorter way from inside the reshaped granules to the surface of granules for evaporation because of the smaller primary thickness of the granules;
- the mechanically reshaped granules can warm up much faster in their entire volume because of the larger surface-to-volume ratio of the reshaped granules;
- the evaporation surface of the reshaped granules increases because of the larger surface-to-volume ratio of the reshaped granules;
- the material properties (e.g. degree of crystallization, crystal structure, development of micro-crashes, etc.) of the reshaped granules changes because of the forces acting on the granule material during press;
- the moisture gradient within the granules is eliminated because of the decreased primary thickness of the granules.

Although the invention has been explained in relation to its preferred embodiment as mentioned above, it is to be understood that many other possible modifications and variations can be made without departing from the scope of the present invention. It is therefore contemplated that the appended claims will cover such modifications and variations that fall within the scope of the invention.

The invention claimed is:

1. A method of producing reshaped plastic granules, comprising the step of providing a plurality of initial granules having a predetermined average surface-to-volume ratio of at most 3 $mm^2/mm^3$,
    wherein the method further comprises the step of flattening the initial granules by pressing the initial granules to produce final granules, having a surface-to-volume ratio of greater than 4 $mm^2/mm^3$; and
    wherein the step of pressing the initial plastic granules comprises pressing the initial plastic granules in a pressing unit having at least two pressing surfaces with a gap therebetween, the width of said gap ranging from 0.05 mm to 0.5 mm.

2. The method according to claim 1, wherein the pressing unit comprises smooth or textured pressing surfaces.

3. The method according to claim 2, wherein the pressing surfaces are tempered to have an optimal surface temperature depending on the material of the initial granules.

4. The method according to claim 2, wherein the pressing unit comprises a rotating pressing roll and a stationary pressing counterpart.

5. The method according to claim 2, wherein the pressing unit comprises one or more pairs of contra-rotating pressing rolls.

6. The method according to claim 5, wherein the co-operating contra-rotating pressing rolls are rotated at the same rotational speed.

7. The method according to claim 5, wherein the co-operating contra-rotated pressing rolls are rotated at different rotational speeds.

8. The method according to claim 2, wherein the pressing surfaces have a surface texture selected from the group consisting of roughened, ribbed, indented and toothed, said surface texture having recesses with a depth of at most 0.05 mm.

9. The method according to claim 1, further comprising drying the reshaped final granules.

10. The method according to claim 1, wherein the flattening is a mechanical reshaping.

11. The method according to claim 1, wherein the initial granules have a predetermined shape, each initial granule having (a) a main plane defined by the two largest, substantially orthogonal dimensions thereof and (b) a primary thickness defined as the dimension thereof in a direction orthogonal to the main plane of the granule, wherein the primary thickness of the initial granules is at least 1 mm within substantially the entire volume of the granules, wherein, after the flattening, the final granules each have (i) a main plane defined by the two largest mutually orthogonal dimensions thereof and (ii) a primary thickness defined as the dimension in a direction orthogonal to the main plane of the granule, wherein the primary thickness of the final granules is at most 0.5 mm.

12. The method according to claim 11, wherein the main plain of the final granules has a diameter of at least 6 mm.

13. The method according to claim 1, wherein the final granules have a volume of at least 12 mm$^3$.

14. An apparatus for carrying out the method of claim 1 of producing reshaped plastic granules from a plurality of initial granules with a predetermined shape and an initial thickness of at least 1 mm within substantially the entire volume of the granules, the apparatus comprising:
a feeding unit for continuously receiving a plurality of said initial granules,
a pressing unit for flattening the initial granules and producing said reshaped final granules,
a receiving chamber for receiving the reshaped final granules from the pressing unit, and
a frame for supporting the feeding unit, the pressing unit and the receiving chamber,
characterized in that
said pressing unit comprises at least two smooth or textured pressing surfaces opposite to each other with a gap therebetween, the width of said gap being adjustable between 0.05 mm and 0.5 mm.

15. The apparatus according to claim 14, wherein the pressing unit comprises a rotating pressing roll and a stationary pressing counterpart.

16. The apparatus according to claim 14, wherein the pressing unit comprises one or more pairs of contra-rotating pressing rolls.

17. The apparatus according to claim 14, wherein the pressing surfaces are made to have a surface texture selected from the group consisting of roughened, ribbed, indented and toothed, said surface texture having recesses with a depth of at most 0.05 mm.

18. The apparatus according to claim 14, wherein each rotating pressing roll of the pressing unit is equipped with a doctor blade for the removal of any residual material of the reshaped granules from the respective pressing surfaces.

19. The apparatus according to claim 14, wherein at least one pressing roll of the pressing unit comprises a movable bearing for adjusting the width of the gap between the pressing surfaces of the pressing unit.

20. The apparatus according to claim 14, wherein the receiving chamber is provided with a drying means for drying the reshaped final granules.

* * * * *